United States Patent
Yin

(10) Patent No.: US 10,498,998 B2
(45) Date of Patent: Dec. 3, 2019

(54) IMAGE SENSOR

(71) Applicant: Fiery Phoenix Inc., Mahe (SC)

(72) Inventor: Ping-Hung Yin, Taipei (TW)

(73) Assignee: Fiery Phoenix Inc., Mahe (SC)

( * ) Notice: Subject to any disclaimer, the term of this patent is extended or adjusted under 35 U.S.C. 154(b) by 0 days.

(21) Appl. No.: 15/995,139

(22) Filed: Jun. 1, 2018

(65) Prior Publication Data

US 2018/0352183 A1    Dec. 6, 2018

Related U.S. Application Data

(60) Provisional application No. 62/513,448, filed on Jun. 1, 2017.

(51) Int. Cl.
| | |
|---|---|
| *H04N 5/378* | (2011.01) |
| *H04N 5/341* | (2011.01) |
| *H04N 5/369* | (2011.01) |
| *H04N 5/345* | (2011.01) |

(52) U.S. Cl.
CPC .............. *H04N 5/378* (2013.01); *H04N 5/341* (2013.01); *H04N 5/345* (2013.01); *H04N 5/369* (2013.01)

(58) Field of Classification Search
CPC ........ H04N 5/378; H04N 5/345; H04N 5/341; H04N 5/369; H04N 5/37455; H04N 5/37457
See application file for complete search history.

(56) References Cited

U.S. PATENT DOCUMENTS

| | | | |
|---|---|---|---|
| 2012/0312963 A1* | 12/2012 | Storm | H04N 5/347 250/208.1 |
| 2015/0070544 A1* | 3/2015 | Smith | H01L 27/14641 348/297 |
| 2016/0118424 A1* | 4/2016 | Guidash | H01L 27/14614 |
| 2017/0339359 A1* | 11/2017 | Kim | H04N 5/378 |
| 2017/0352694 A1* | 12/2017 | Panicacci | H01L 27/14609 |
| 2018/0145639 A1* | 5/2018 | Kim | H03F 1/308 |
| 2018/0205897 A1* | 7/2018 | Kim | H04N 5/37457 |
| 2018/0220094 A1* | 8/2018 | Yang | H04N 5/378 |

\* cited by examiner

*Primary Examiner* — Shahbaz Nazrul
(74) *Attorney, Agent, or Firm* — JCIPRNET

(57) ABSTRACT

An image sensor including a plurality of pixel-group sensors is provided. Each of the pixel-group sensors includes a first pixel group, a second pixel group and a read out circuit. The first pixel group includes a plurality of first pixels. A floating diffusion node of each of the first pixels is coupled to a first node. The second pixel group includes a plurality of second pixels. A floating diffusion node of each of the second pixels is coupled to a second node. The read out circuit is coupled to the first node and the second node, and configured to compare a voltage of the first node with a voltage of the second node, so as to sequentially obtain a digital pixel value of each of the first pixels and the second pixels.

10 Claims, 4 Drawing Sheets

IMAGE SENSOR

CROSS-REFERENCE TO RELATED APPLICATION

This application claims the priority benefit of U.S. provisional application Ser. No. 62/513,448, filed on Jun. 1, 2017. The entirety of the above-mentioned patent application is hereby incorporated by reference herein and made a part of this specification.

BACKGROUND

Technical Field

The present disclosure relates to an image sensor, and particularly to an image sensor with high performance.

Description of Related Art

Generally speaking, known image sensor is designed toward the trend of reduced pixel size, such that more number of pixels can be provided within a fixed layout area, thereby realizing higher image resolution. Additionally, another design trend is to increase fill factor of pixel, that is, to increase the ratio of light-sensing area of pixel to the overall area of the pixel, thereby reinforcing light sensitivity of image sensor. However, either the pixel size is reduced or the fill factor of pixel is increased, the area for arranging other processing circuit in the image sensor is reduced accordingly, and thus the processing speed of image sensor is affected. However, in application of biometric recognition product (e.g., facial recognition, pupil recognition or three-dimensional finger-print recognition), not only accurate recognition capability is required, a fast responding speed is also needed. The responding speed of biometric recognition is subject to the processing speed of the adopted image sensor. In light of the above, it is an important issue for practitioners of the field to find out how to improve processing speed of image sensor.

SUMMARY

In view of the above, the disclosure provides an image sensor with high performance and capable of improving responding speed of biometric recognition.

According to the disclosure, an image sensor includes a plurality of pixel-group sensors. Each of the pixel-group sensors includes a first pixel group, a second pixel group and a read out circuit. The first pixel group includes a plurality of first pixels. A floating diffusion node of each of the first pixels is coupled to a first node. The second pixel group includes a plurality of second pixels. A floating diffusion node of each of the second pixels is coupled to a second node. The read out circuit is coupled to the first node and the second node and configured to compare a voltage of the first node with a voltage of the second node, thereby sequentially obtaining a digital pixel value of each of the first pixels and the second pixels.

According to an embodiment of the disclosure, each of the pixel-group sensors further includes a storage circuit. The storage circuit is coupled to the read out circuit to store the digital pixel value of each of the first pixels and the second pixels.

According to an embodiment of the disclosure, each of the pixel-group sensors has a plurality of light-sensing regions and a plurality of non-light sensing regions, wherein the read out circuit and the storage circuit are disposed in the non-light sensing regions.

Based on the above, the image sensor provided in the disclosure is designed with a plurality of pixels that share one read out circuit, thereby saving circuit area under the condition that the image sensor has limited layout area. Additionally, each of the pixel-group sensors in the image sensor could have a storage circuit to serve as a buffer circuit between the image sensor and an external processing circuit, such that the overall speed and performance of the image sensor can be improved.

To make the foregoing features and advantages of the present disclosure clearer and more comprehensible, embodiments are described below in detail with reference to the accompanying drawings.

DESCRIPTION OF THE EMBODIMENTS

Figure 1:
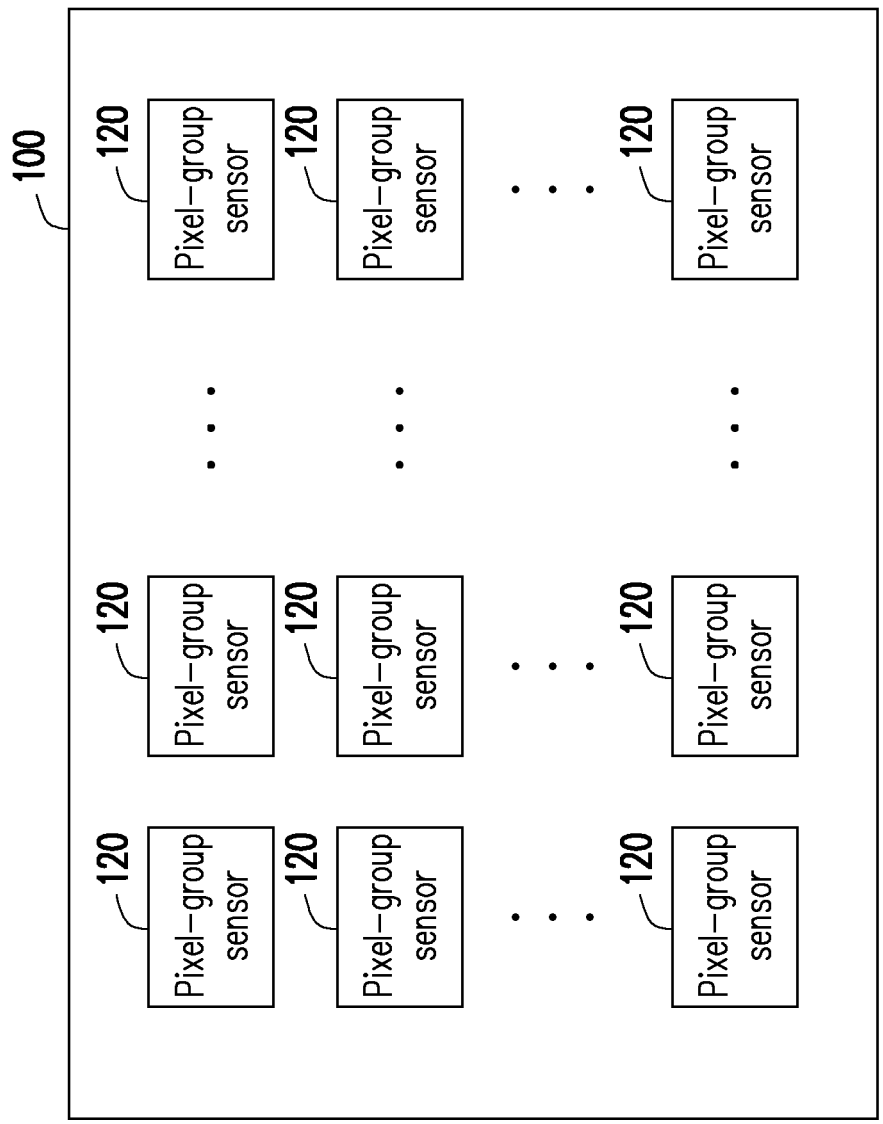
FIG. 1 is a schematic block diagram showing an image sensor according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

Figure 2:
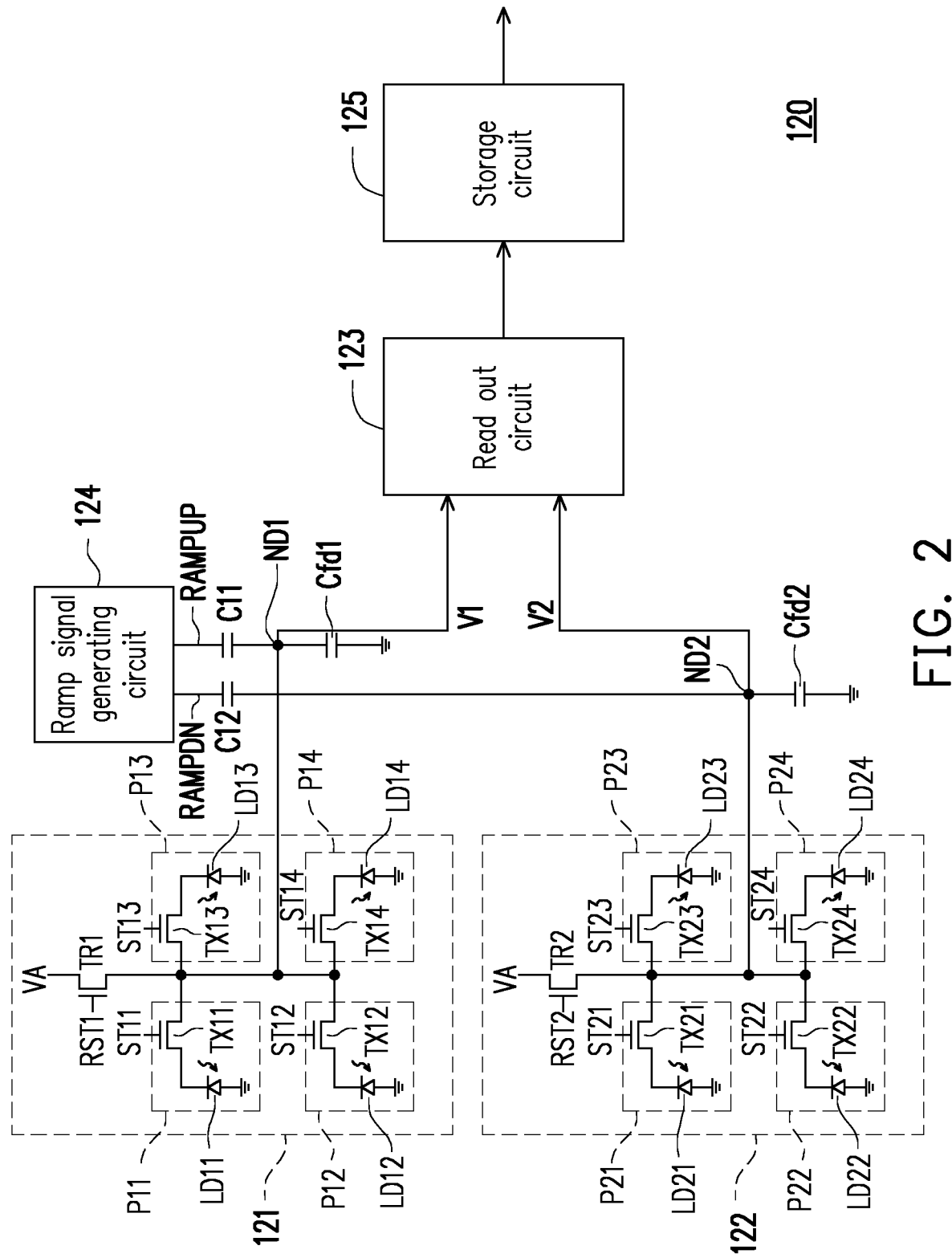
FIG. 2 is a schematic block diagram showing a pixel-group sensor in an image sensor according to an embodiment of the disclosure.

Referring to FIG. 1 and FIG. 2, FIG. 1 is a schematic block diagram showing an image sensor according to an embodiment of the disclosure, and FIG. 2 is a schematic block diagram showing a pixel-group sensor in an image sensor according to an embodiment of the disclosure. An image sensor 100 includes a plurality of pixel-group sensors 120. Each of the pixel-group sensors 120 may include a first pixel group 121, a second pixel group 122 and a read out circuit 123 (single read out circuit), which should not be construed as a limitation to the disclosure. The first pixel group 121 may include a plurality of first pixels, and the second pixel group 122 may include a plurality of second pixels. However, for ease of description and clarity of illustration, the following embodiment is exemplified with the configuration that the first pixel group 121 includes four first pixels P11-P14, and the second pixel group 122 includes four second pixels P21-P24. The embodiments of the configuration that the first pixel group 121 has other number of first pixel and the second pixel group 122 has other number of second pixel may be deduced from the descriptions below.

A floating diffusion node of each of the first pixels P11-P14 is coupled to a first node ND1, wherein a floating diffusion capacitor at the first node ND1 is represented by capacitor Cfd1. A floating diffusion node of each of the second pixels P21-P24 is coupled to a second node ND2, wherein a floating diffusion capacitor at the second node ND2 is represented by capacitor Cfd2. The read out circuit 123 is coupled to the first node ND1 and the second node ND2 and configured to compare a voltage V1 of the first node ND1 with a voltage V2 of the second node ND2, thereby sequentially obtaining a digital pixel value of each of the first pixels P11-P14 and the second pixels P21-P24. It can be understood that the embodiment adopts the circuit design that eight pixels (i.e., first pixels P11-P14 and second pixels P21-P24) share one read out circuit 123 and thus it is possible to save circuit area under the condition that the layout area is limited.

According to an embodiment of the disclosure, the first pixel P11 may include a first light sensor LD11 and a first transmitting transistor TX11. The anode of the first light sensor LD11 is coupled to a ground terminal. A first terminal of the first transmitting transistor TX11 is coupled to the cathode of the first light sensor LD11. A second terminal of the first transmitting transistor TX11 is coupled to a floating diffusion node of the first pixel P11 (i.e., the first node ND1). A control terminal of the first transmitting transistor TX11 receives a first transmitting control signal ST11, wherein the first transmitting control signal ST11 may turn on/off the first transmitting transistor TX11, thereby controlling charge transmission between the first light sensor LD11 and the first node ND1. The first pixel P12 may include a first light sensor LD12 and a first transmitting transistor TX12. The anode of the first light sensor LD12 is coupled to the ground terminal. A first terminal of the first transmitting transistor TX12 is coupled to the cathode of the first light sensor LD12. A second terminal of the first transmitting transistor TX12 is coupled to a floating diffusion node of the first pixel P12 (i.e., the first node ND1). A control terminal of the first transmitting transistor TX12 receives a first transmitting control signal ST12, wherein the first transmitting control signal ST12 may turn on/off the first transmitting transistor TX12, thereby controlling charge transmission between the first light sensor LD12 and the first node ND1. The first pixel P13 may include a first light sensor LD13 and a first transmitting transistor TX13. The anode of the first light sensor LD13 is coupled to the ground terminal. A first terminal of the first transmitting transistor TX13 is coupled to the cathode of the first light sensor LD13. A second terminal of the first transmitting transistor TX13 is coupled to a floating diffusion node of the first pixel P13 (i.e., the first node ND1). A control terminal of the first transmitting transistor TX13 receives a first transmitting control signal ST13, wherein the first transmitting control signal ST13 may turn on/off the first transmitting transistor TX13, thereby controlling charge transmission between the first light sensor LD13 and the first node ND1. The first pixel P14 may include a first light sensor LD14 and a first transmitting transistor TX14. The anode of the first light sensor LD14 is coupled to the ground terminal. A first terminal of the first transmitting transistor TX14 is coupled to the cathode of the first light sensor LD14. A second terminal of the first transmitting transistor TX14 is coupled to a floating diffusion node of the first pixel P14 (i.e., first node ND1). A control terminal of the first transmitting transistor TX14 receives a first transmitting control signal ST14, wherein the first transmitting control signal ST14 may turn on/off of the first transmitting transistor TX14, thereby controlling charge transmission between the first light sensor LD14 and the first node ND1.

According to an embodiment of the disclosure, the first pixel group 121 may further include a first reset transistor TR1. A first terminal of the first reset transistor TR1 is coupled to a reset power VA. A second terminal of the first reset transistor TR1 is coupled to the first node ND1. A control terminal of the first reset transistor TR1 receives a first reset control signal RST1, wherein the first reset control signal RST1 may turn on/off the first reset transistor TR1, thereby controlling reset of the first node ND1 and/or the first light sensors LD11-LD14.

According to an embodiment of the disclosure, the second pixel P21 may include a second light sensor LD21 and a second transmitting transistor TX21. The anode of the second light sensor LD21 is coupled to the ground terminal. A first terminal of the second transmitting transistor TX21 is coupled to the cathode of the second light sensor LD21. A second terminal of the second transmitting transistor TX21 is coupled to a floating diffusion node of the second pixel P21 (i.e., the second node ND2). A control terminal of the second transmitting transistor TX21 receives a second transmitting control signal ST21, wherein the second transmitting control signal ST21 may turn on/off the second transmitting transistor TX21, thereby controlling charge transmission between the second light sensor LD21 and the second node ND2. The second pixel P22 may include a second light sensor LD22 and a second transmitting transistor TX22. The anode of the second light sensor LD22 is coupled to the ground terminal. A first terminal of the second transmitting transistor TX22 is coupled to the cathode of the second light sensor LD22. A second terminal of the second transmitting transistor TX22 is coupled to a floating diffusion node of the second pixel P22 (i.e., the second node ND2). A control terminal of the second transmitting transistor TX22 receives a second transmitting control signal ST22, wherein the second transmitting control signal ST22 may turn on/off the second transmitting transistor TX22, thereby controlling charge transmission between the second light sensor LD22 and the second node ND2. The second pixel P23 may include a second light sensor LD23 and a second transmitting transistor TX23. The anode of the second light sensor LD23 is coupled to the ground terminal. A first terminal of the second transmitting transistor TX23 is coupled to the cathode of the second light sensor LD23. A second terminal of the second transmitting transistor TX23 is coupled to a floating diffusion node of the second pixel P23 (i.e., the second node ND2). A control terminal of the second transmitting transistor TX23 receives a second transmitting control signal ST23, wherein the second transmitting control signal ST23 may turn on/off of the second transmitting transistor TX23, thereby controlling charge transmission between the second light sensor LD23 and the second node ND2. The second pixel P24 may include a second light sensor LD24 and a second transmitting transistor TX24. The anode of the second light sensor LD24 is coupled to the ground terminal. A first terminal of the second transmitting transistor TX24 is coupled to the cathode of the second light sensor LD24. A second terminal of the second transmitting transistor TX24 is coupled to a floating diffusion node of the second pixel P24 (i.e., the second node ND2). A control terminal of the second transmitting transistor TX24 receives a second transmitting control signal ST24, wherein the second transmitting control signal ST24 may turn on/off the second transmitting transistor TX24, thereby controlling charge transmission between the second light sensor LD24 and the second node ND2.

According to an embodiment of the disclosure, the second pixel group 122 may further include a second reset transistor TR2. A first terminal of the second reset transistor TR2 is coupled to the reset power VA. A second terminal of the second reset transistor TR2 is coupled to the second node ND2. A control terminal of the second reset transistor TR2 receives a second reset control signal RST2, wherein the second reset control signal RST2 may turn on/off the second reset transistor TR2, thereby controlling reset of the second node ND2 and/or the second light sensors LD21-LD24.

According to an embodiment of the disclosure, the pixel-group sensor 120 may further include a ramp signal generating circuit 124. The ramp signal generating circuit 124 is coupled to the first node ND1 and the second node ND2 via coupling capacitors C11 and C12 respectively, and is configured to gradually increase a voltage of one of the first node ND1 and the second node ND2 and gradually decrease a voltage of another one of the first node ND1 and the second node ND2. Thereafter, the read out circuit 123 compares a voltage V1 of the first node ND1 and a voltage V2 of the second node ND2 to determine a digital pixel value of a corresponding pixel; more details are provided in the descriptions below. It can be understood that the full well capacity (FWC) of the first node ND1 is subject to the coupling capacitor C11 and the floating diffusion capacitor Cfd1, and the FWC of the second node ND2 is subject to the coupling capacitor C12 and the floating diffusion capacitor Cfd2. According to an embodiment of the disclosure, the ramp signal generating circuit 124 may be realized as existing ramp signal generator, but the disclosure provides no limitation thereto.

According to an embodiment of the disclosure, the pixel-group sensor 120 may further include a storage circuit 125. The storage circuit 125 is coupled to the read out circuit 123 and configured to store the digital pixel value of each of the first pixels P11-P14 and the second pixels P21-P24 obtained by the read out circuit 123. Additionally, the storage circuit 125 may respond to a read request of an external processing circuit and provide the digital pixel value of a corresponding pixel for the external processing circuit to perform subsequent image processing or image recognition operation. It can be understood that the storage circuit 125 may serve as a buffer circuit between the image sensor 100 and the external processing circuit, thereby improving the overall speed and performance of the image sensor 100. Moreover, the storage circuit 125 may output the digital pixel value of the corresponding pixel to the external processing circuit only after receiving the read request of the external processing circuit. In this manner, the problem of frame loss can be avoided.

According to an embodiment of the disclosure, the pixel-group sensor 120 has a plurality of light-sensing regions and a plurality of non-light sensing regions, wherein the light-sensing regions serve as the first light sensors LD11-LD14 and the second light sensors LD21-LD24 of the pixel-group sensor 120. The first reset transistor TR1, the second reset transistor TR2, the first transmitting transistors TX11-TX14, the second transmitting transistors TX21-TX24, the read out circuit 123, the ramp signal generating circuit 124 and the storage circuit 125 of the pixel-group sensor 120 are disposed or arranged in the non-light sensing regions.

It can be understood that the area of the non-light sensing region affects the number of the read out circuit 123 that can be disposed in the area and the storage capacity of the storage circuit 125, thereby affecting the overall speed and performance of the image sensor 100. Accordingly, the image sensor 100 provided in the disclosure is not like existing image sensor which is designed based on the consideration of maximizing fill factor of the pixel, but is designed in the manner that a plurality of pixels share one read out circuit while seeking optimization of fill factor of pixel, thereby improving the overall performance of the image sensor 100.

Figure 3:
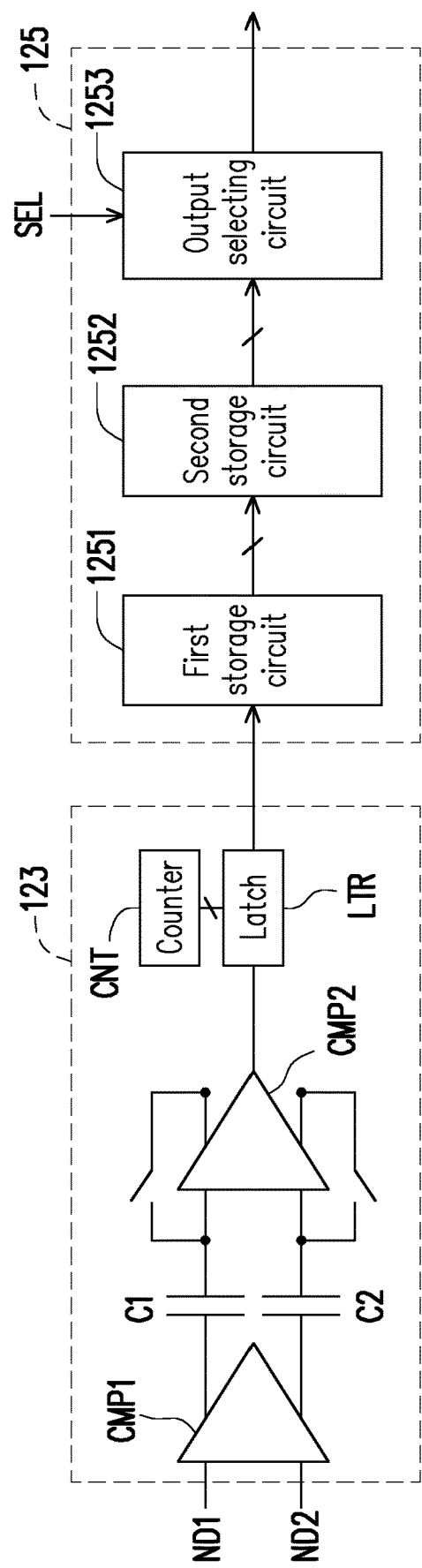
FIG. 3 is a schematic circuit block diagram of a read out circuit and a storage circuit according to an embodiment of the disclosure.

Referring to FIG. 2 and FIG. 3, FIG. 3 is a schematic circuit block diagram of a read out circuit and a storage circuit according to an embodiment of the disclosure. The read out circuit 123 may include a first comparator CMP1, a second comparator CMP2, a latch LTR and a counter CNT, which should not be construed as a limitation to the disclosure. A first input terminal of the first comparator CMP1 is coupled to the first node ND1. A second input terminal of the first comparator CMP1 is coupled to the second node ND2. A first input terminal of the second comparator CMP2 may be coupled to the first input terminal of the first comparator CMP1 through a capacitor C1. A second input terminal of the second comparator CMP2 may be coupled to a second output terminal of the first comparator CMP1 through a capacitor C2. An output terminal of the second comparator CMP2 may provide a comparison result to the latch LTR. The latch LTR is coupled to the output terminal of the second comparator CMP2 to receive a comparison result, and the latch LTR is coupled to the counter CNT, wherein the latch LTR may latch a counting value of the counter CNT as the digital pixel value of the corresponding pixel according to the comparison result.

The storage circuit 125 may include a first storage circuit 1251, a second storage circuit 1252 and an output selecting circuit 1253. The first storage circuit 1251 is coupled to the read out circuit 123 to serve as a first stage storage. The first storage circuit 1251 is configured to sequentially receive and store the digital pixel value of each of the first pixels P11-P14 and the second pixels P21-P24 from the read out circuit 123. The second storage circuit 1252 is coupled to the first storage circuit 1251 to serve as a second stage storage. The second storage circuit 1252 is configured to sequentially receive and store the digital pixel value of each of the first pixels P11-P14 and the second pixels P21-P24 from the first storage circuit 1251. The output selecting circuit 1253 is coupled to the second storage circuit 1252 and configured to sequentially output the digital pixel value of each of the first pixels P11-P14 and the second pixels P21-P24 stored in the second storage circuit 1252 according to a selecting signal SEL so as for the external processing circuit to perform subsequent image processing or image recognition operation.

According to an embodiment of the disclosure, the first storage circuit 1251 and the second storage circuit 1252 may be realized as a latch, a register, a static random access memory (SRAM) or a dynamic random access memory (DRAM); and the output selecting circuit 1253 may be realized as a switch or a multiplexer, but the disclosure provides no limitation thereto.

According to an embodiment of the disclosure, if the digital pixel value of each of the first pixels P11-P14 and the second pixels P21-P24 is represented by 1 byte, the memory capacity of the first storage circuit 1251 and the memory capacity of the second storage circuit 1252 may be 8 bytes. In other words, the pixel-group sensor 120 having eight pixels (i.e., first pixels P11-P14 and second pixels P21-P24) may adopt the storage circuit 125 with 16 bytes, which should not be construed as a limitation to the disclosure. Actually, the designer may determine the memory capacity required by the storage circuit 125 depending on actual application or need of design.

The following embodiment describes exposure operation and reading-out operation of the pixel-group sensor 120. Referring to FIG. 2, first of all, in the exposure operation, the first reset control signal RST1 and the first transmitting control signals ST11-ST14 may be driven to a high logical level to turn on the first reset transistor TR1 and the first transmitting transistors TX11-TX14 respectively, thereby resetting the first light sensors LD11-LD14. Thereafter, the first reset control signal RST1 and the first transmitting control signals ST11-ST14 may be driven to a low logical level to turn off the first reset transistor TR1 and the first transmitting transistors TX11-TX14 respectively and the first light sensors LD11-LD14 is exposed to light for a period of exposing time to be integrated. Additionally, the second reset control signal RST2 and the second transmitting control signals ST21-ST24 may be driven to the high logical level to turn on the second reset transistor TR2 and the second transmitting transistors TX21-TX24 respectively, thereby resetting the second light sensors LD21-LD24. Thereafter, the second reset control signal RST2 and the second transmitting control signals ST21-ST24 may be driven to the low logical level to turn off the second reset transistor TR2 and the second transmitting transistors TX21-TX24 respectively and the second light sensors LD21-LD24 is exposed to light for a period of exposing time to be integrated. After the exposure operation of the pixel-group sensor 120 is completed, the reading-out operation of the pixel-group sensor 120 may be performed.

Figure 4:
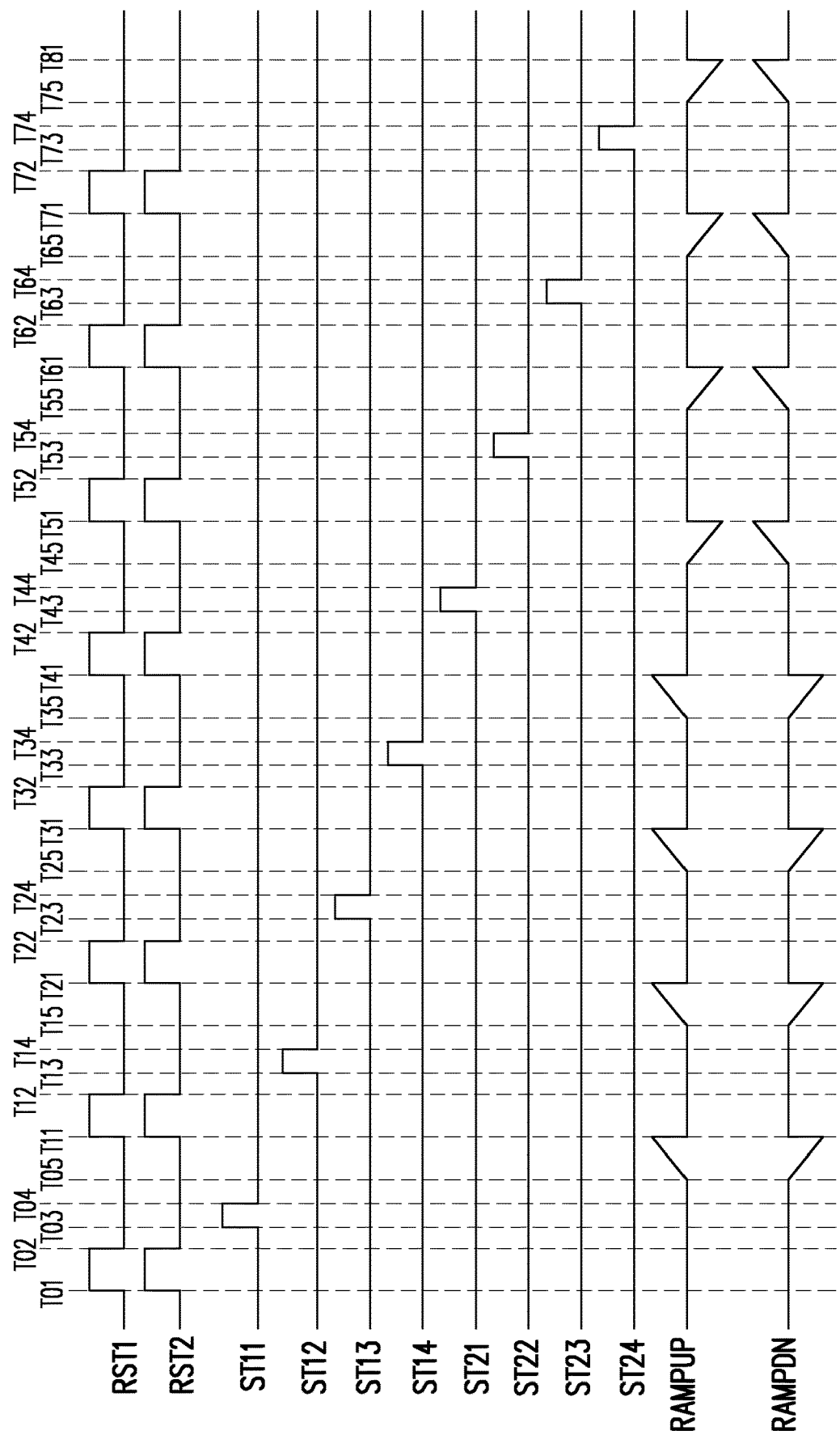
FIG. 4 is a timing diagram showing read-out operation of a pixel-group sensor according to an embodiment of the disclosure.

Referring to FIG. 2-FIG. 4, FIG. 4 is a timing diagram showing read-out operation of a pixel-group sensor 120 according to an embodiment of the disclosure. First of all, at time point T01, the first reset control signal RST1 and the second reset control signal RST2 are driven to the high logical level to turn on the first reset transistor TR1 and the second reset transistor TR2, thereby resetting the first node ND1 and the second node ND2. Thereafter, at time point T02, the first reset control signal RST1 and the second reset control signal RST2 are driven to the low logical level to turn off the first reset transistor TR1 and the second reset transistor TR2. At this time, the voltage V1 of the first node ND1 and the voltage V2 of the second node ND2 are the voltage of the reset power VA. Thereafter, between time points T03-T04, the first transmitting control signal ST11 is driven to the high logical level to turn on the first transmitting transistor TX11, thereby transmitting the charge of the first light sensor LD11 to the first node ND1. Next, between time points T04-T05, when the voltage V1 of the first node ND1 is lower than the voltage V2 (which is the voltage of reset power VA at this time) of the second node ND2, the first comparator CMP1 is tripped, which causes the second comparator CMP2 to trip. Afterwards, at time point T05, the ramp signal generating circuit 124 begins to generate a ramp signal RAMPUP to gradually increase the voltage V1 of the first node ND1 through the coupling capacitor C11 and generate a ramp signal RAMPDN to gradually decrease the voltage V2 of the second node ND2 through the coupling capacitor C12. When the voltage V1 of the first node ND1 is higher than the voltage V2 of the second node ND2, the first comparator CMP1 is tripped again, which causes the second comparator CMP2 to trip again and generate a latch signal to the latch LTR, such that the latch LTR latches the counting value of the counter CNT as the digital pixel value of the first pixel P11.

Similarly, at time point T11, the first reset control signal RST1 and the second reset control signal RST2 are driven to the high logical level to turn on the first reset transistor TR1 and the second reset transistor TR2, thereby resetting the first node ND1 and the second node ND2. Thereafter, at time point T12, the first reset control signal RST1 and the second reset control signal RST2 are driven to the low logical level to turn off the first reset transistor TR1 and the second reset transistor TR2. At this time, the voltage V1 of the first node ND1 and the voltage V2 of the second node ND2 are the voltage of the reset power VA. Thereafter, between time points T13-T14, the first transmitting control signal ST12 is driven to the high logical level to turn on the first transmitting transistor TX12, thereby transmitting the charge of the first light sensor LD12 to the first node ND1. Thereafter, between time points T14-T15, when the voltage V1 of the first node ND1 is lower than the voltage V2 (which is voltage of reset power VA at this time) of the second node ND2, the first comparator CMP1 is tripped, which causes the second comparator CMP2 to trip. Afterwards, at time point T15, the ramp signal generating circuit 124 begins to generate the ramp signal RAMPUP to gradually increase the voltage V1 of the first node ND1 and generate the ramp signal RAMPDN to gradually decrease the voltage V2 of the second node ND2. When the voltage V1 of the first node ND1 is higher than the voltage V2 of the second node ND2, the first comparator CMP1 is tripped again, which causes the second comparator CMP2 to trip again and generate the latch signal to the latch LTR, such that the latch LTR latches the counting value of the counter CNT as the digital pixel value of the first pixel P12.

Similarly, the operation of the pixel-group sensor 120 for obtaining the digital pixel value of the first pixel P13 between time points T21-T31 and the operation for obtaining the digital pixel value of the first pixel P14 between time points T31-T41 may be deduced from related descriptions provided above, and no repetitions are incorporated hereinafter.

It should be noted that the voltage V1 of the first node ND1 is gradually increased by injecting charge to the coupling capacitor C11, and the voltage V2 of the second node ND2 is gradually decreased by withdrawing the charge of the coupling capacitor C12, such that the latch LTR latches the counting value of the counter CNT as the digital pixel value of the corresponding first pixel when the voltage V1 of the first node ND1 and the voltage V2 of the second node ND2 cross each other. Therefore, the time length or speed for the read out circuit to obtain the digital pixel value of the corresponding first pixel is determined according to the amount of change in charge (i.e., amount of injected or withdrawn charge) of the coupling capacitor C11 and C12. On the contrary, existing image sensor uses a source follower circuit, a correlated double sampling (CDS) circuit and an analog to digital conversion (ADC) circuit to obtain the digital pixel value of the corresponding pixel, and the time length or speed for obtaining the digital pixel value of the pixel is subject to the amount of overall charge of the floating diffusion capacitor of the pixel. In the embodiment of the disclosure, since the amount of charge injected into the coupling capacitor C11 (or amount of charge withdrawn from the coupling capacitor C12) is less than the amount of overall charge of the floating diffusion capacitor, as compared with existing image sensor, the image sensor provided in the embodiment of the disclosure is capable of obtaining the digital pixel value of the corresponding pixel more quickly and the resolution of the obtained digital pixel value is higher.

At time point T41, the first reset control signal RST1 and the second reset control signal RST2 are driven to the high logical level to turn on the first reset transistor TR1 and the second reset transistor TR2, thereby resetting the first node ND1 and the second node ND2. Thereafter, at time point T42, the first reset control signal RST1 and the second reset control signal RST2 are driven to the low logical level to turn off the first reset transistor TR1 and the second reset transistor TR2. At this time, the voltage V1 of the first node ND1 and the voltage V2 of the second node ND2 are the voltage of the reset power VA. Thereafter, between time points T43-T44, the second transmitting control signal ST21 is driven to the high logical level to turn on the second transmitting transistor TX21, thereby transmitting the charge of the second light sensor LD21 to the second node ND2. Thereafter, between time points T44-T45, when the voltage V2 of the second node ND2 is lower than the voltage V1 (which is the voltage of reset power VA at this time) of the first node ND1, the first comparator CMP1 is tripped, which causes the second comparator CMP2 to trip. Thereafter, at time point T45, the ramp signal generating circuit 124 begins to generate the ramp signal RAMPUP to gradually decrease the voltage V1 of the first node ND1 and generate the ramp signal RAMPDN to gradually increase the voltage V2 of the second node ND2. When the voltage V2 of the second node ND2 is higher than the voltage V1 of the first node ND1, the first comparator CMP1 is tripped again, which causes the second comparator CMP2 to trip again and generate the latch signal to the latch LTR, such that latch LTR latches the counting value of the counter CNT as the digital pixel value of the second pixel P21.

Similarly, at time point T51, the first reset control signal RST1 and the second reset control signal RST2 are driven to the high logical level to turn on the first reset transistor TR1 and the second reset transistor TR2, thereby resetting the first node ND1 and the second node ND2. Thereafter, at time point T52, the first reset control signal RST1 and the second reset control signal RST2 are driven to the low logical level to turn off the first reset transistor TR1 and the second reset transistor TR2. At this time, the voltage V1 of the first node ND1 and the voltage V2 of the second node ND2 are the voltage of the reset power VA. Thereafter, between time points T53-T54, the second transmitting control signal ST22 is driven to the high logical level to turn on the second transmitting transistor TX22, thereby transmitting the charge of the second light sensor LD22 to the second node ND2. Thereafter, between time points T54-T55, when the voltage V2 of the second node ND2 is lower than the voltage V1 (which is the voltage of reset power VA at this time) of the first node ND1, the first comparator CMP1 is tripped, which causes the second comparator CMP2 to trip. Thereafter, at time point T55, the ramp signal generating circuit 124 begins to generate the ramp signal RAMPUP to gradually decrease the voltage V1 of the first node ND1 and generate the ramp signal RAMPDN to gradually increase the voltage V2 of the second node ND2. When the voltage V2 of the second node ND2 is higher than the voltage V1 of the first node ND1, the first comparator CMP1 is tripped again, which causes the second comparator CMP2 to trip again and generate the latch signal to the latch LTR, such that the latch LTR latches the counting value of the counter CNT as the digital pixel value of the second pixel P22.

Additionally, the operation of the pixel-group sensor 120 for obtaining the digital pixel value of the second pixel P23 between time points T61-T71 and the operation for obtaining the digital pixel value of the second pixel P24 between time points T71-T81 may be deduced from related descriptions provided above, and no repetitions are incorporated hereinafter.

In summary, the image sensor provided in the embodiment of the disclosure is designed with a plurality of pixels that share one read out circuit, thereby saving circuit area under the condition that the layout area is limited. Additionally, each of the pixel-group sensors in the image sensor could have a storage circuit to serve as a buffer circuit between the image sensor and an external processing circuit, such that the overall speed and performance of the image sensor can be improved.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. An image sensor, comprising:
   a plurality of pixel-group sensors, each of the pixel-group sensors comprising:
   a first pixel group, comprising a plurality of first pixels, a floating diffusion node of each of the first pixels coupled to a first node;
   a second pixel group, comprising a plurality of second pixels, a floating diffusion node of each of the second pixels coupled to a second node;
   a read out circuit, coupled to the first node and the second node, and configured to compare a voltage of the first node with a voltage of the second node, thereby sequentially obtaining a digital pixel value of each of the first pixels and the second pixels; and
   a ramp signal generating circuit, coupled to the first node and the second node, and configured to gradually increase a voltage of one of the first node and the second node, and gradually decrease a voltage of the another one of the first node and the second node.

2. The image sensor as claimed in claim 1, wherein each of the pixel-group sensors further comprises:
   a storage circuit, coupled to the read out circuit to store the digital pixel value of each of the first pixels and the second pixels.

3. The image sensor as claimed in claim 2, wherein each of the pixel-group sensors has a plurality of light-sensing regions and a plurality of non-light sensing regions, and the read out circuit and the storage circuit are disposed in the non-light sensing regions.

4. The image sensor as claimed in claim 2, wherein the storage circuit comprises:
   a first storage circuit, coupled to the read out circuit, and configured to sequentially store the digital pixel value of each of the first pixels and the second pixels;
   a second storage circuit, coupled to the first storage circuit, and configured to sequentially receive and store the digital pixel value of each of the first pixels and the second pixels from the first storage circuit; and
   an output selecting circuit, coupled to the second storage circuit, and configured to sequentially output the digital pixel value of each of the first pixels and the second pixels stored in the second storage circuit according to a selecting signal.

5. The image sensor as claimed in claim 1, wherein the first pixel group further comprises:
   a first reset transistor, a first terminal of the first reset transistor coupled to a reset power, a second terminal of the first reset transistor coupled to the first node, and a control terminal of the first reset transistor receiving a first reset control signal.

6. The image sensor as claimed in claim 1, wherein each of the first pixels comprises:
   a first light sensor; and
   a first transmitting transistor, a first terminal of the first transmitting transistor coupled to the first light sensor, a second terminal of the first transmitting transistor coupled to the floating diffusion node, and a control terminal of the first transmitting transistor receiving one of a plurality of first transmitting control signals.

7. The image sensor as claimed in claim 1, wherein the second pixel group further comprises:
a second reset transistor, a first terminal of the second reset transistor coupled to a reset power, a second terminal of the second reset transistor couponed to the second node, and a control terminal of the second reset transistor receiving a second reset control signal.

8. The image sensor as claimed in claim 1, wherein each of the second pixels comprises:
a second light sensor; and
a second transmitting transistor, a first terminal of the second transmitting transistor coupled to the second light sensor, a second terminal of the second transmitting transistor coupled to the floating diffusion node, and a control terminal of the second transmitting transistor receiving one of a plurality of second transmitting control signals.

9. The image sensor as claimed in claim 1, wherein a coupling capacitor is provided between the ramp signal generating circuit and each of the first node and the second node, and speed of the read out circuit for obtaining the digital pixel value of each of the first pixels and the second pixels is determined according to change in an amount of charge of the coupling capacitor.

10. The image sensor as claimed in claim 1, wherein the read out circuit comprises:
a first comparator, a first input terminal of the first comparator coupled to the first node, and a second input terminal of the first comparator coupled to the second node;
a second comparator, a first input terminal of the second comparator coupled to a first output terminal of the first comparator, and a second input terminal of the second comparator coupled to a second output terminal of the first comparator;
a latch, coupled to an output terminal of the second comparator to receive a comparison result, and
a counter, coupled to the latch,
wherein the latch latches a counting value of the counter as the digital pixel value according to the comparison result.

* * * * *